United States Patent

[11] 3,525,356

| [72] | Inventors | Dwight N. Johnson<br>325 N. Bel Air, Anaheim, California 92801;<br>Albert R. Cameron, 10121 Cutty Sark Drive, Huntington Beach, California 92646 |
|---|---|---|
| [21] | Appl. No. | 768,619 |
| [22] | Filed | Oct. 18, 1968<br>continuation-in-part of Ser. No. 509, 488, Nov. 24, 1965, now Pat. No. 3,425,442 |
| [45] | Patented | Aug. 25, 1970 |

[54] PRESSURE REGULATOR
5 Claims, 6 Drawing Figs.
[52] U.S. Cl. .................................................... 137/505.15, 137/505.46, 137/505.47
[51] Int. Cl. ........................................................ F16k 31/12
[50] Field of Search ........................................ 137/505.15, 505.46

[56] References Cited
UNITED STATES PATENTS

| 3,150,684 | 9/1964 | Guinard .................. | 137/505.46X |
| 3,207,175 | 9/1965 | Pauly ...................... | 137/505.46 |
| 3,276,470 | 10/1966 | Griffing ................... | 137/505.15 |

*Primary Examiner*— Harold W. Weakley
*Attorney*—Lyon and Lyon

ABSTRACT: A pressure regulator of the spring loaded diaphragm type has a chamber on one side of the diaphragm provided with an inlet and an outlet. A valve at the inlet has relatively movable parts, one of which is moved by the diaphragm. A movable element on one of the valve parts employs a calibrated spring to permit movement of the element to compensate for the change in force of the diaphragm spring, due to a change in operating position of the diaphragm, brought about by an increase in inlet pressure.

Patented Aug. 25, 1970 3,525,356

INVENTORS.
DWIGHT N. JOHNSON
ALBERT R. CAMERON
BY
Lyon & Lyon
ATTORNEYS.

INVENTORS.
DWIGHT N. JOHNSON
ALBERT R. CAMERON
BY Lyon & Lyon
ATTORNEYS.

PRESSURE REGULATOR

This invention is a continuation-in-part of our copending application for Pressure Regulator, Ser. No. 509,488, filed Nov. 24, 1965, now Pat. No. 3,425,442.

This invention relates to a pressure regulator in which compensation is introduced as a function of inlet pressure.

Figure 1:
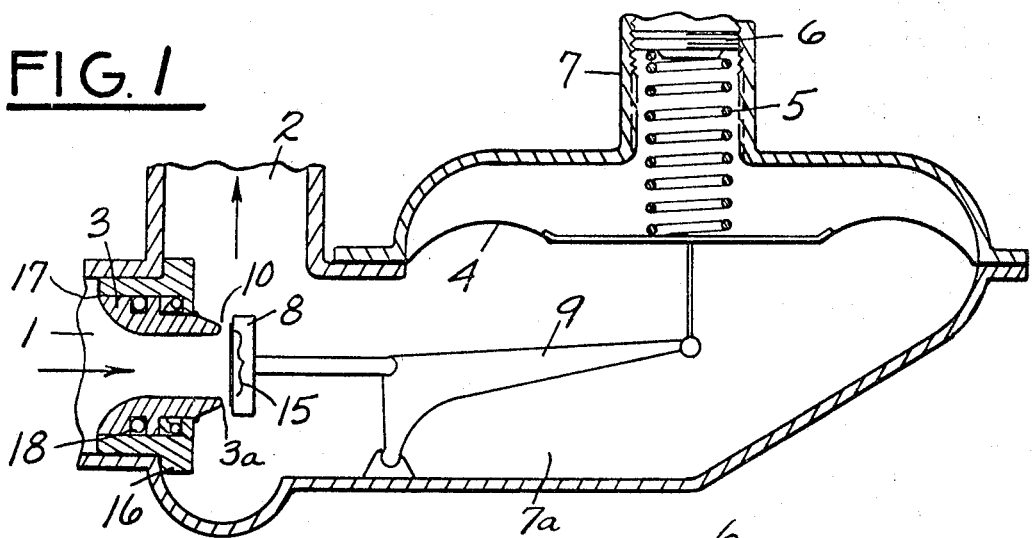
FIG. 1 is a section through a pressure regulator showing the position of the parts at low inlet pressure.
Figure 2:
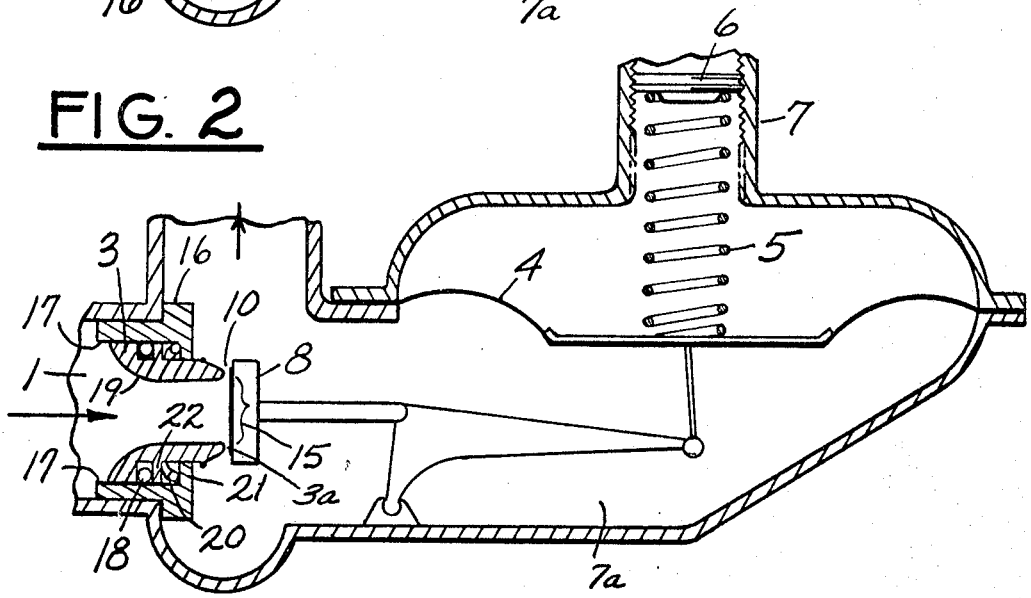
FIG. 2 is a sectional view of the same regulator at high inlet pressure.

In FIGS. 1 and 2 of the drawings, the conventional parts of the regulator are readily identified, 1 being the inlet, 2 the outlet, 3 the inlet orifice or valve seat member, and 4 the diaphragm loaded on its under side by the outlet pressure. The upper side of the diaphragm is loaded by suitable means such as a spring 5 exerting a downward force determined by the adjustment of a spring seat member 6 screwed into an upwardly extending tubular portion of the body or housing 7. The diaphragm 4 and spring 5 constitute control means responsive to pressure in the chamber 7a. In operation, the diaphragm moves up or down until the outlet pressure in the chamber 7a on the under side of the diaphragm reaches equilibrium with the spring pressure on the upper side of the diaphragm. The flow of gas or liquid through the orifice 3 is controlled by a valve closure member 8 having its position controlled by mechanism 9 connected to the diaphragm. As the outlet pressure falls, the diaphragm 4 moves downward, moving the valve member 8 away from the port 10 at the inner end of the orifice 3. This admits the larger amount of gas required to maintain the outlet pressure. In the conventional regulator, the inlet orifice 3 is mounted in fixed relation to the regulator housing. With this exception, the parts so far described are or may be of common construction and may differ substantially in appearance from the diagrammatic construction illustrated.

Figure 5:
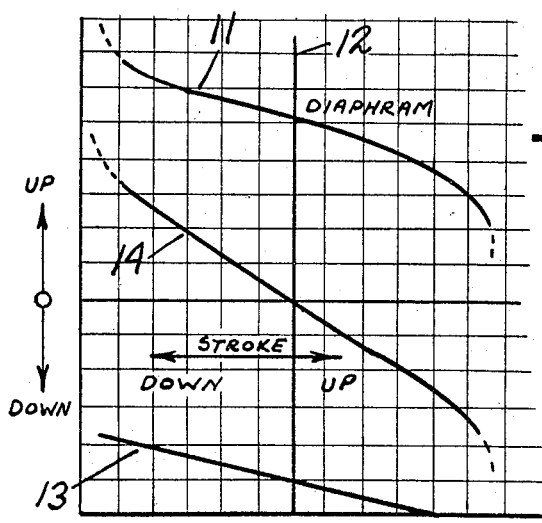
FIG. 5 is a diagram of the forces in the regulator.

There are several factors which affect the operation of the regulator. First, at constant outlet pressure, the upward force exerted by the diaphragm 4 varies in accordance with the diaphragm position as indicated by the curve 11 in FIG. 5. As compared to a central position indicated by line 12, the upward force exerted by the diaphragm at constant outlet pressure increases as the diaphragm moves downward. This is a characteristic of diaphragms. Second, the downward force exerted by the spring 5 also varies with the diaphragm position as indicated by curve 13. The resultant or net force exerted on the diaphragm at constant outlet pressure varies with the diaphragm position as indicated by the curve 14 which is the sum of curves 11 and 13. Curve 14 shows the force applied to the linkage 9. Third, the gas pressure at the inlet 1 is applied to the central area 15 of the valve 8, producing a thrust directly proportional to the inlet pressure. The position of the valve 8 with respect to the port 10 accordingly does not depend solely upon the outlet pressure but rather is due to the balance between the downward forces exerted by the spring 5 and valve 8 against upward forces exerted by the diaphragm 4, so that as the inlet pressure rises, the outlet pressure has a corresponding increase.

Figure 6:
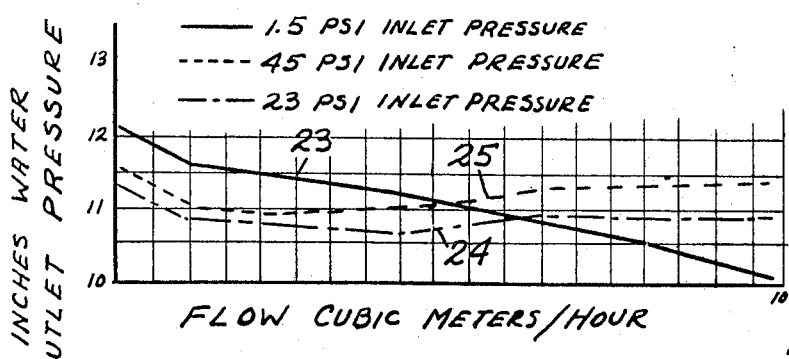
FIG. 6 is a diagram of output pressure compared to rate of flow for selected input pressures.

In order to prevent unwanted increase in outlet pressure due to increased inlet pressure, the orifice 3 is movably mounted in a fitting 16 fixed to the housing. From one aspect, the orifice 3 comprises an annular piston slidably mounted in a cylinder 17 at the center of the fitting 16. The orifice is sealed to the cylinder walls by a piston ring such as O-ring 18. From this description it will be understood that the valve seat member 3 has a differential area thereon responsive to inlet pressure. The inlet pressure acts on the annular end face 19 of the orifice exerting a force proportional to the inlet pressure tending to move the orifice toward the right against a calibrated spring 20 arranged between a shoulder 21 on the fitting 16 and a shoulder 22 on the orifice. In FIG. 1, the orifice is shown in the position it occupies at low inlet pressures, for example 5 pounds per square inch. As the inlet pressure increases, the orifice moves to the right, as shown in FIG. 2, relative to the fitting 16 and in order to maintain the gas flow, the valve 8 must have a corresponding movement to the right and causing a downward movement of the diaphragm. The lower position or attitude of the diaphragm 4 causes a greater force for the same differential pressure as indicated by curve 14. Since the increase in inlet pressure causes an increase in valve thrust, in opposition to the increased force exerted by the diaphragm, the forces tend to cancel out and make the operation of the regulator less dependent of the inlet pressure. An example of the effect of changes in inlet pressure on the regulator performance is shown in FIG. 6 where curves 23, 24 and 25 show the variation in outlet pressure with flow for inlet pressures of 1½ pounds per square inch, 23 pounds per square inch and 45 pounds per square inch. Note that, as the inlet pressure increases, the outlet pressure tends to remain more nearly constant. This construction eliminates the need for step down or double regulator installations in many applications where the inlet pressure is high. It also permits an increase in the regulator flow capacity through the use of larger diameter orifices and valve ports.

Figure 3:
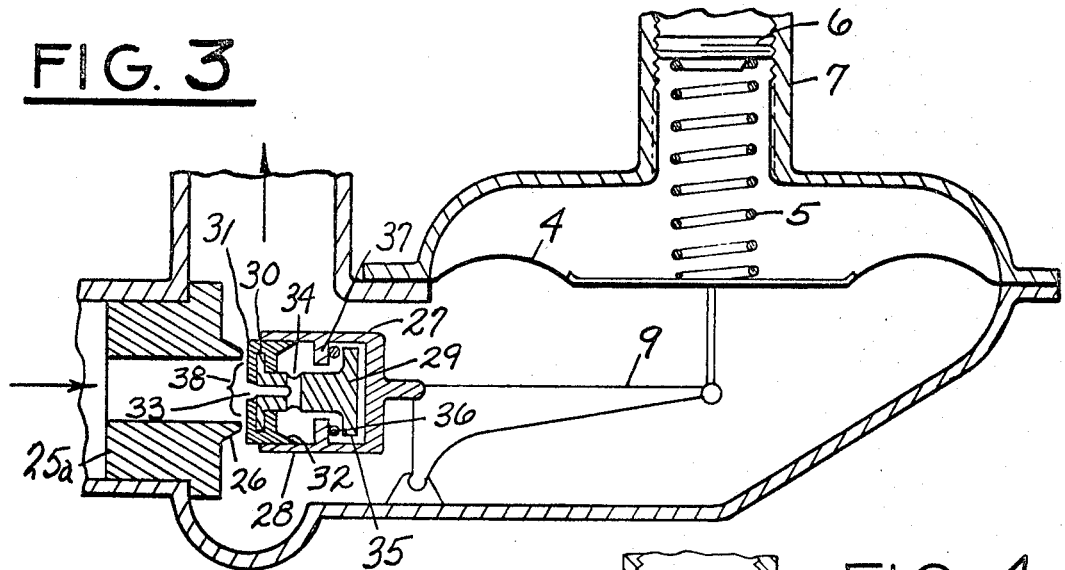
FIG. 3 is a sectional view showing a modification.

In the construction of FIGS. 1 and 2, the compensation for inlet pressure is part of the valve member 3 which is stationary in the conventional regulator design. In the regulator of FIG. 3, the compensation is built into the valve member which is movable in the conventional regulator design. In this regulator, corresponding parts are indicated by the same reference numerals. The inlet orifice 25a is fixed in the regulator housing in the same manner as conventional regulators and has a stationary valve seat 26 presented toward a movable valve member 27 connected to and positioned by the linkage 9. The movable valve member 27 comprises a cylinder 28 having slidably mounted therein a piston 29 having a head 30 carrying an annular member 31 having a sealing lip 32 making sealing engagement with the bore of the cylinder 28. The cylinder 28 and piston 29 are each shown as single pieces but usually would be made of several pieces. At the center of the member 31 is a bore or a port 33 leading to a port 34 communicating with the inner surface of the member 31. The inner surface of the member 31 is accordingly subjected to the inlet pressure through the ports 33 and 34. Toward the bottom of the cylinder 28 the piston 29 has a flange 35 engaging a spring 36 seated on a flange 37 on the cylinder. As the inlet pressure increases, the piston 29 is moved toward the left, compressing the spring 36 between the flanges 35 and 37. From this description it will be understood that the annular member 31 on the piston 29 has a differential area thereon responsive to inlet pressure. The effect of increased inlet pressure is to move the valve member 31 toward the valve port 26, thereby causing lowering of the diaphragm 4 and increasing its effective upward force for a given outlet pressure. This compensates for the increased force exerted on the central section 38 of the valve member by the increased inlet pressure and has the same kind of compensating effect as the spring mounted orifice in the FIG. 1 design.

Figure 4:
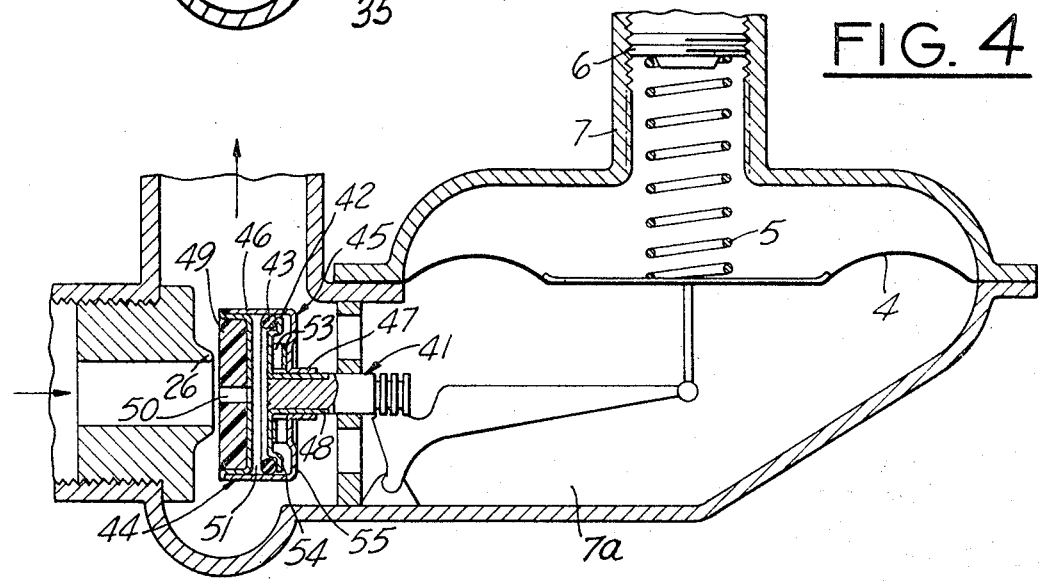
FIG. 4 is a sectional view showing another modification.

In the modification shown in FIG. 4, the compensating device is built into the movable valve member 41, as is the case in the device of FIG. 3, but the construction employed is different. The movable valve member 41 is provided with an end flange 42 which is fixed thereto and which carries a seal ring 43 on its outer periphery. A closure element 44 includes a shell 45 provided with a cylindrical portion 46 slidably receiving the seal ring 43.

The tubular neck 47 of the shell 45 is mounted for axial sliding movement on the movable valve member 41. In the device shown in FIG. 4, the end flange 42 is provided with a hub sleeve 48 fixed on the member 41 and functioning as an integral part thereof. The tubular neck 47 is slidably mounted on the hub sleeve 48.

The closure disc 49 is fixed to and sealed with respect to the shell 45 and functions as an integral part thereof. The disc 49 cooperates with the stationary valve seat 26 to control flow through the inlet into the body chamber 7a beneath the diaphragm 4. The closure disc is provided with a central opening 50 which communicates with the space 51 within the shell 45, and between the end flange 42 and the closure disc 49.

A wave spring 53 of conventional form is positioned between the end flange 42 and the shell 45 and acts to bias the shell and closure disc 49 in a direction away from the stationary valve seat 46. Pressure in space 51 opposes the action of the wave spring 53, and movement of the parts in a direction to compress the wave spring 53 is limited by a contact of the shoulders 54 and 55 on the end flange 42 and shell 45, respectively. The wave spring 53 is calibrated to compensate for the change in force of the diaphragm spring due to a change in operating position of the diaphragm, brought about by an increase in inlet pressure.

When the disc 49 is closed against the stationary valve seat 26, the closure element 44 has a differential area subjected to inlet pressure; thus, one side of the disc 49 is subjected to inlet pressure within the circumference of the stationary valve seat 26, and the other side is subjected to pressure within the circumference of the outer portion of the seal ring 43. Accordingly, an increase in inlet pressure acts to move the closure element 44 relative to the movable valve member 41 in a direction to compress the wave spring 53.

Having fully described our invention, it is to be understood that we are not to be limited to the details herein set forth but that our invention is of the full scope of the appended claims.

We claim:

1. A pressure regulator comprising a body defining a pressure chamber, the body having an inlet to said pressure chamber and an outlet from said pressure chamber, valve means controlling flow into the chamber including a stationary valve seat fixed relative to the body at the inlet and an axially movable valve member within the chamber, a closure element on the movable valve member cooperating with said seat, said closure element being mounted for axial movement on the movable valve member and having a sliding sealing fit with respect thereto, said movable closure element having a differential area thereon responsive to inlet pressure and being movable toward said seat upon increase in inlet pressure, a first spring biasing said movable closure element for movement in a direction away from said seat, control means responsive to pressure in said pressure chamber to shift said movable valve member toward and away from said stationary seat, said control means including a second spring and a flexible diaphragm having one side exposed to said pressure chamber, the travel of the said movable closure element with respect to the movable valve member being limited to an extent less than the travel of said movable valve member, and the force of said first spring being calibrated to permit movement of the said movable closure element to compensate for the change in force of the second spring due to a change in operating position of the diaphragm brought about by an increase in inlet pressure.

2. The combination set forth in claim 1 wherein said closure element is mounted within a portion of said movable valve member.

3. The combination set forth in claim 1 wherein said closure element encircles a portion of said movable valve member.

4. The combination set forth in claim 1 in which said movable valve member is provided with an end flange encircled by said closure element, said first spring comprising a wave spring positioned between said end flange and a portion of said closure element, and a seal ring on the end flange slidably engaging said closure element.

5. A pressure regulator comprising a body defining a pressure chamber, the body having an inlet to said pressure chamber and an outlet from said pressure chamber, valve means controlling flow into the chamber including a stationary valve seat fixed relative to the body at the inlet and an axially movable valve member within the chamber, the movable valve member having an end flange, a closure element on the movable valve member cooperating with said seat, said closure element including a shell mounted for axial movement on the movable valve member, said shell encircling said flange, a seal ring on the flange slidably engaging the shell, the shell having a seat-contacting disc provided with a differential area thereon responsive to inlet pressure and being movable with the shell toward said seat upon increase in inlet pressure, a wave spring interposed between said flange and said shell for biasing said movable closure element for movement in a direction away from said seat, control means responsive to pressure in said pressure chamber to shift said movable valve member toward and away from said stationary seat, said control means including a second spring and a flexible diaphragm having one side exposed to said pressure chamber, means limiting the travel of the said movable closure element with respect to the movable valve member to an extent less than the travel of said movable valve member, and the force of said wave spring being calibrated to permit movement of the said movable closure element to compensate for the change in force of the second spring due to a change in operating position of the diaphragm brought about by an increase in inlet pressure.